H. H. SWINDELL.
BEAN HARVESTER.
APPLICATION FILED JULY 3, 1919.

1,401,829. Patented Dec. 27, 1921.
4 SHEETS—SHEET 1.

WITNESSES

INVENTOR.
BY H. H. Swindell,
ATTORNEY.

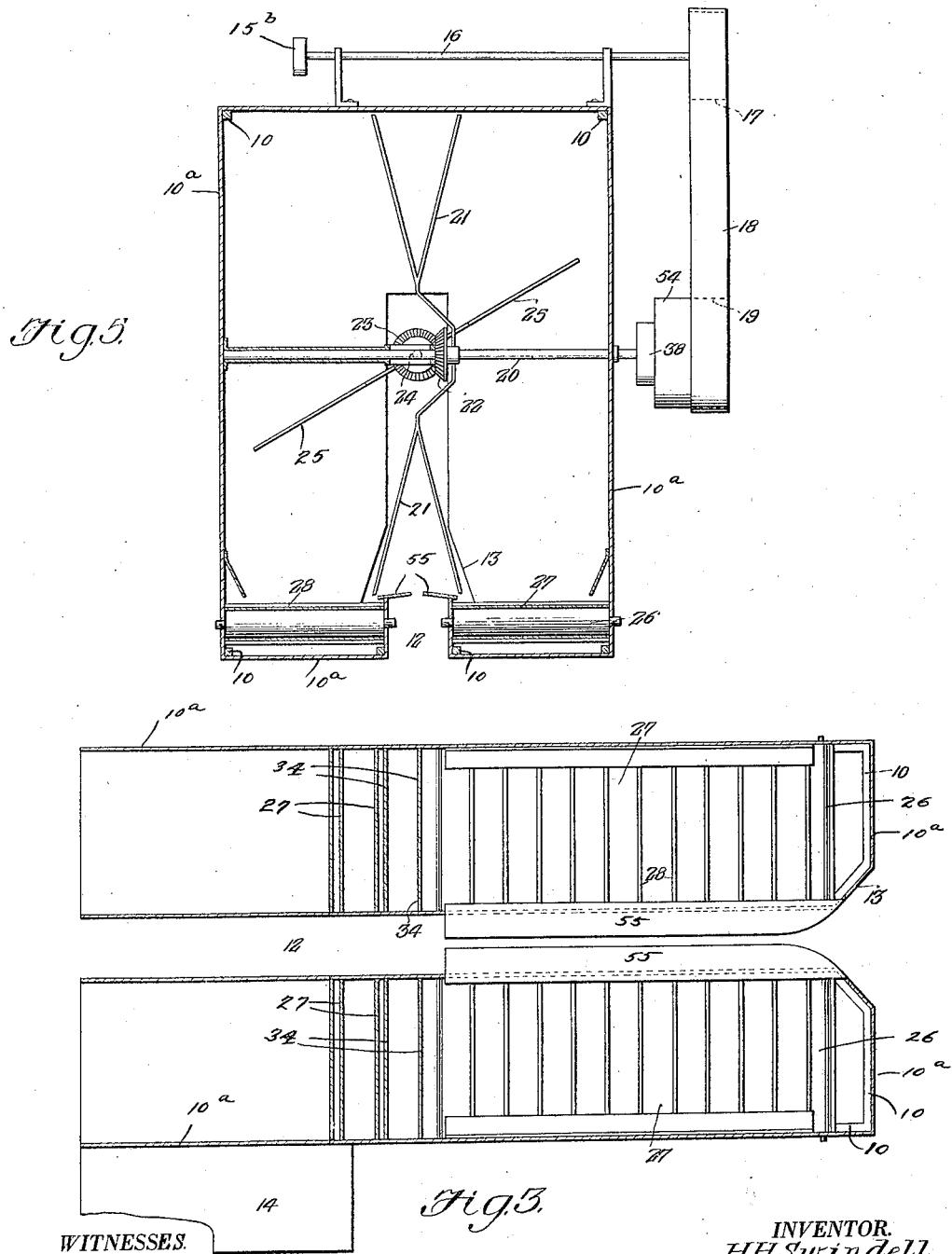

H. H. SWINDELL.
BEAN HARVESTER.
APPLICATION FILED JULY 3, 1919.
1,401,829.
Patented Dec. 27, 1921.
4 SHEETS—SHEET 3.
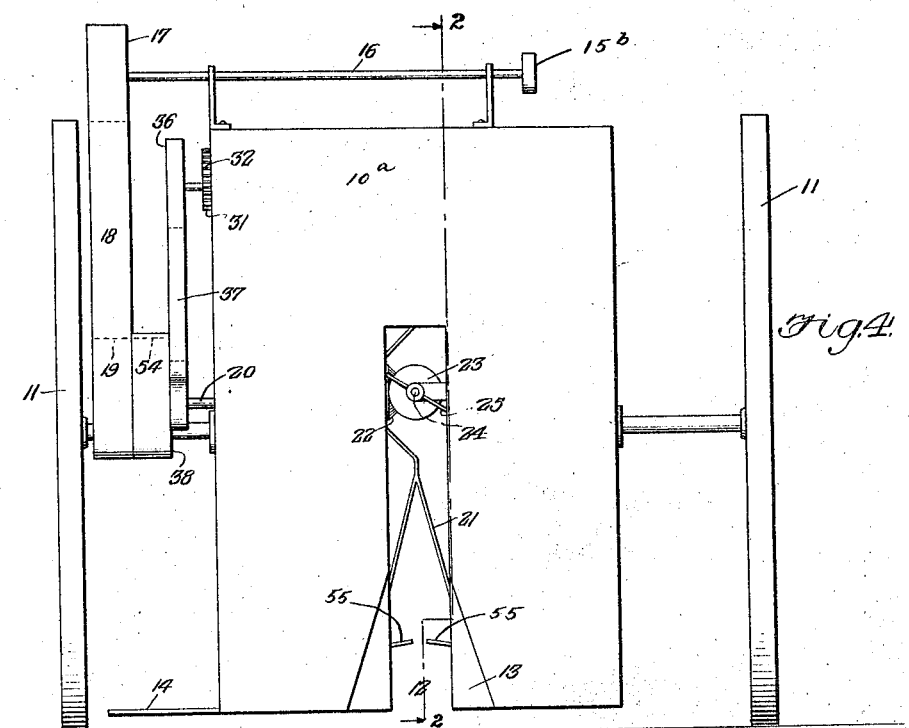
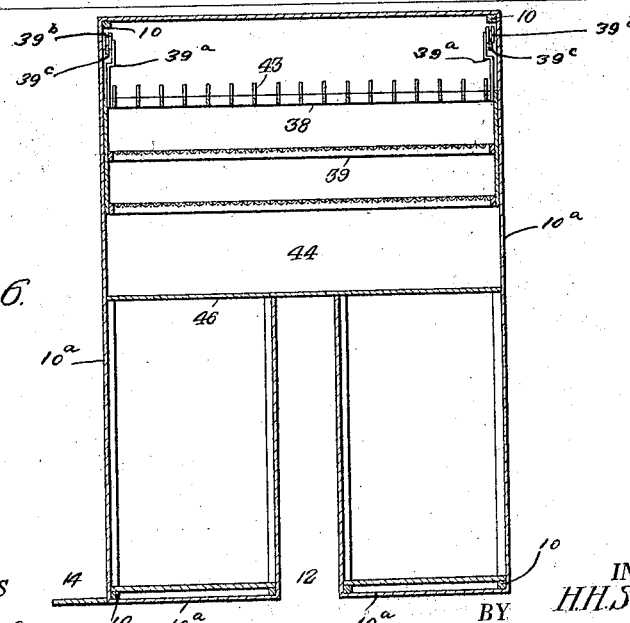
WITNESSES
J.H. Crawford
INVENTOR.
H.H. Swindell,
BY Victor J. Evans
ATTORNEY.

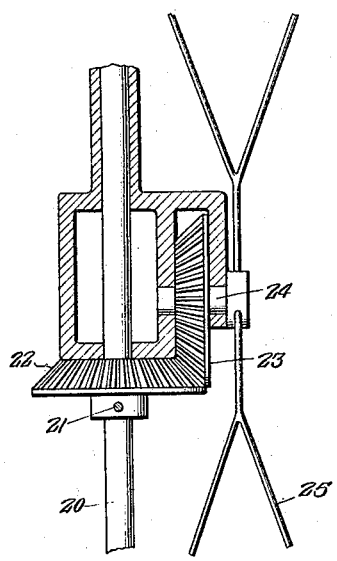
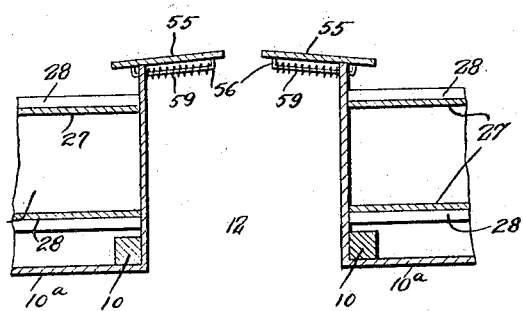
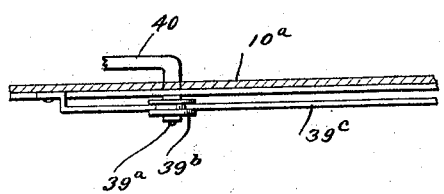

UNITED STATES PATENT OFFICE.

HERMAN H. SWINDELL, OF RALEIGH, NORTH CAROLINA.

BEAN-HARVESTER.

1,401,829.  Specification of Letters Patent.  Patented Dec. 27, 1921.

Application filed July 3, 1919. Serial No. 308,530.

*To all whom it may concern:*

Be it known that I, HERMAN H. SWINDELL, a citizen of the United States, residing at Raleigh, in the county of Wake and State of North Carolina, have invented new and useful Improvements in Bean-Harvesters, of which the following is a specification.

This invention relates to harvesting devices, particularly to harvesters for beans, and has for its object the provision of a device adapted to be pulled, as by a team of horses, over a bean field in straddling relation to a row of beans and which is provided with mechanism whereby the bean pods will be struck violently longitudinally and transversely of the rows whereby the pods will not only be torn open but will also be torn off from the plants and thrown onto an elevating mechanism leading to a separator in which the beans will be separated from the pods and stems adhering thereto, the beans being subsequently winnowed and discharged through a chute into the sacks or other preferred receptacle.
An important object is the provision of a harvester of this character in which the operating parts are driven by an engine carried by the device whereby the draft animals will serve only as means for propelling the device over the bean field.

Another object is the provision of a device of this character in which is provided a separator mechanism comprising a plurality of riffles which are oscillated by the driving mechanism and which are arranged in superposed relation whereby upon passing through the successive riffles the beans will be separated from the stems, portions of the pods and small fragments adhering to or still remaining with the beans, the riffle mechanism being disposed above a fan blast whereby dust and the like will be blown away so that the beans will eventually be free from all foreign matter.
Another object is the provision of a device of this character which will be comparatively simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings, in which—

Figure 1 is a side elevation of the device,

Fig. 2 is a longitudinal sectional view therethrough, on the line 2—2 of Fig. 4, Fig. 3 is a horizontal sectional view on the line 3—3 of Fig. 2, showing the lower frame-work of the device in plan, Fig. 4 is a front elevation, Fig. 5 is a transverse sectional view on the line 5—5 of Fig. 1, illustrating the beater mechanism more clearly, Fig. 6 is a cross sectional view taken on the line 6—6 of Fig. 2 through the rear portion of the device and showing the various riffles in cross section, and

Fig. 7 is a detail sectional view showing a portion of the beater mechanism.

Fig. 8 is a detail cross sectional view through the guide means, and

Fig. 9 is a detail sectional view showing the guide mounting for the shaker.

Figure 2:
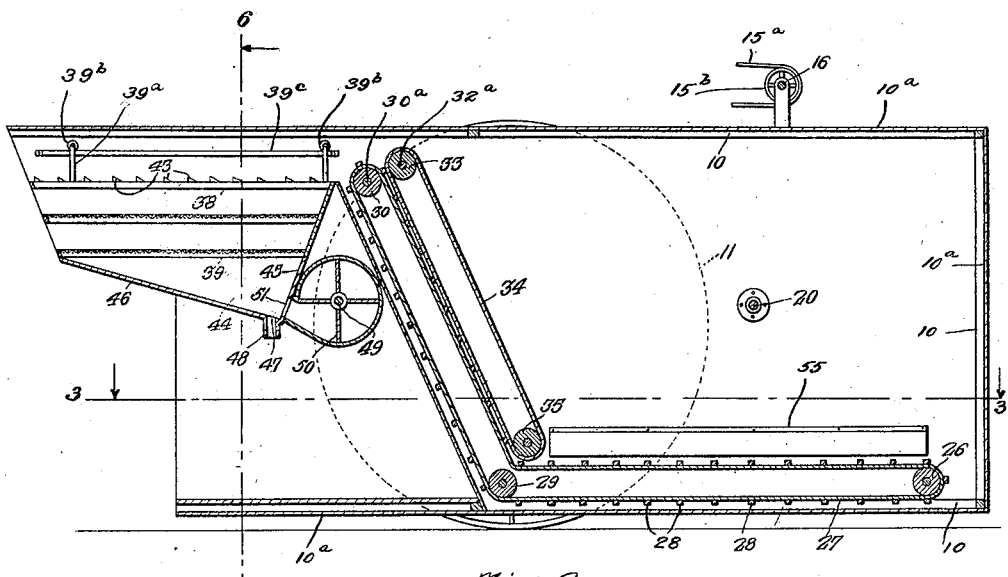
Figure 1:
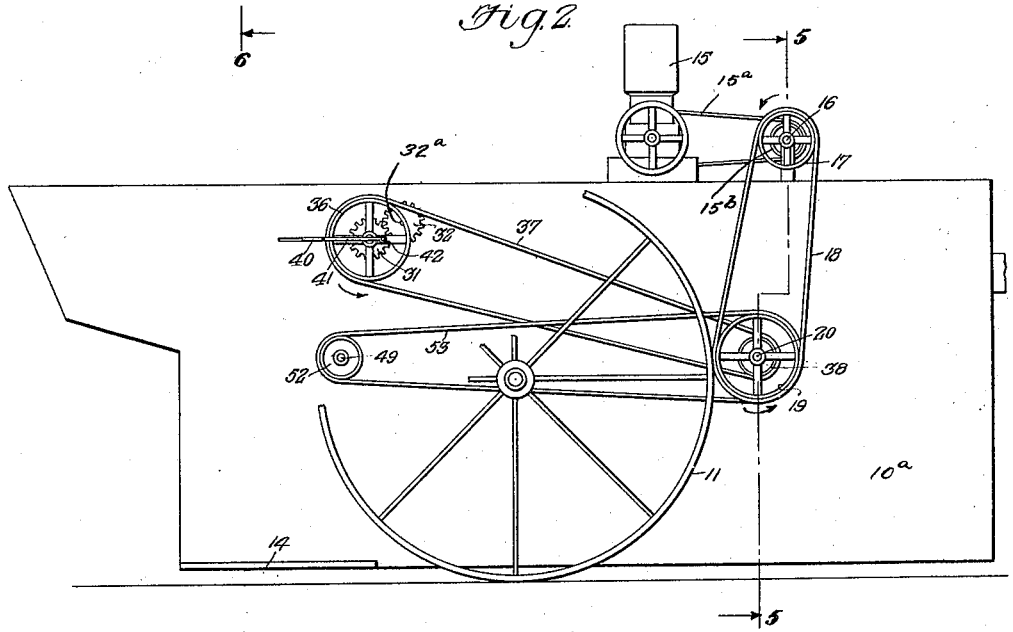

Referring more particularly to the drawings, the device is shown as a body portion which is formed as a substantially rectangular inclosure having a suitable framework 10 as its support, this frame-work including the proper horizontal and vertical members connected by suitable diagonally disposed brace members, these details of construction being a matter of mechanical design. For obvious reasons as will hereinafter appear, this frame-work is covered by a suitable sheathing $10^a$ which may be and preferably is, metallic in nature, such as sheet iron. The body is supported upon suitable wheels 11. This body is so formed that the lower portion thereof is bifurcated to provide a longitudinal passage 12 terminating at its lower end in a flared portion 13. This flared portion is adapted to extend over and at opposite sides of a row of beans to be harvested. At its lower portion, this body is so formed as to provide a platform 14 upon which an operator may stand for controlling the mechanism to be hereinafter described.

Mounted upon the body at some suitable point is an engine 15 driving the belt $15^a$ trained about a pulley $15^b$ on a shaft 16 carrying a pulley 17 about which is trained a belt 18 which is in turn trained about a pulley 19 secured upon a shaft 20 secured upon the body. Secured upon the shaft 20 is a beater member which includes diametrically disposed arms 21, each of which is formed as a V-shaped rod. Also secured upon the shaft 20 is a bevel gear 22 meshing with a bevel gear 23 carried by a stub shaft 24 upon which is secured a beater member formed of diametrically extending arms 25 which are also V-shaped. By this construction it will be seen that when the shaft 20 is rotated the beater members 21 will rotate in a direction longitudinally of the rows and the beater members 25 will rotate transversely of the rows.

Journaled in the lower portion of the body at the front end thereof is a transverse roller 26 about which is trained an endless belt or apron 27 carrying suitable slats 28 and having its lower stretch trained under a transverse roller 29, the apron being also trained about a transverse roller 30 journaled at the top portion of the body at a point rearwardly of its center. Secured upon the shaft 30ª of the roller 30 is a gear 31 which meshes with a similar gear 32 secured upon the shaft 32ª of a roller 33 about which is trained an auxiliary belt or apron 34 which is trained about a roller 35. The belt 34 is so arranged that it will be parallel with and will have one stretch engaging the slats of the adjacent stretch of the apron 27, thus holding the upper stretch down to the roller 29. From this construction it will be seen that as the device is pulled along a row of beans the beater members 21 and 25 will knock the bean pods onto the belt 27 whereupon the belt 27 will coöperate with the belt 34 for elevating the beans.

The belts 27 and 34 are driven by means of a pulley 36 which is secured upon the shaft 30ª of the roller 30 and about which is trained a belt 37 which is in turn trained about a pulley 38 on the shaft 20.

Disposed within the upper part of the rear portion of the body is a plurality of stationary screws 39 and a shaker 38 suspended for oscillatory or vibratory movement by means of hangers 39ª having rollers 39ᵇ traveling the tracks 39ᶜ. Connected with the shaker 38 is a forwardly extending arm 40 to which is connected a pitman 41 connected with a wrist pin 42 carried by the pulley 36 so that during rotation of the pulley 36 the shaker will be vibrated. The shaker 38 is formed as a frame proper with transverse bars or strips 43 which are disposed relatively far apart and this shaker is adapted for sifting stalks or stems and the larger fragments of the pods from the beans. The lower screen members 39 are formed of bars or rods arranged closer together than those of the shaker 38 or these bars or rods may be supplanted by a suitable wire screen as shown of the proper mesh to permit the passage of beans while preventing the passage of pod fragments and the like. The stationary screens and the shaker are disposed within a pocket portion 44 formed in the body and this pocket portion has its forward wall 45 and its bottom wall 46 inclined and converging, as shown.

At its forward end the pocket portion 44 is provided with an outlet 47 surrounded by a downwardly extending flange 48 beneath which are disposed the sacks to be filled with the beans.

Disposed transversely of the body at the lower front corner of the pocket member 44 is a shaft 49 upon which is mounted a blower fan 50 which is adapted to force a draft through an opening 51 in the forward wall of the pocket member upwardly through the stationary screen 38 and shaker 39 for blowing out stems, stalks, and fragments of bean pods. This blower member is actuated by a pulley 52 which is secured upon the shaft 49 and which has trained thereabout a belt 53 trained about a pulley 54 secured upon the shaft 20.

Mounted upon the upper edges of the sheathing 10ᵇ at the edges of the longitudinal channel 12, are plates 55 which carry on their undersides U-shaped rods 56 slidable through this portion of the sheathing and surrounded by coil springs 57, the purpose of which is to hold the plates 55 with their adjacent edges spaced apart a slight distance to permit the passage of the bean plants therebetween. In case a rather large bunch of the plants is encountered it will be apparent that the plates 55 may be forced apart thereby against the resistance of the springs 57. These plates 55 are inclined and practically cover the passage 12 so that beans knocked from the plants will not fall through the passage 12 but will fall onto the plates 55 and be deflected thereby onto the conveyers 27.

Any suitable draft mechanism may be attached to the device whereby it may be drawn along a bean field by horses or other suitable propelling means. When the engine 15 is in operation and the device is drawn along a field in straddling relation to a row of beans, the shaft 20 rotated by virtue of its connection with the driven shaft 16, will drive the beater members 21 and 25 longitudinally and transversely of the bean row, respectively. As these beater members rotate they will of course strike the bean pods and not only tear them from the plants but also burst them open. These bean pods will then fall upon the apron 27 by which they will be conveyed upwardly and rearwardly and be discharged onto the shaker 38. The shaker 38 is constantly agitated by virtue of the connection of the arm 40 therewith and as the beans and broken pods are discharged thereonto the beans and smaller fragments of pods will pass through the shaker 38 onto the screen 39. In view of the fact that the screen 39 is finer than the shaker 38 only the beans and very tiny fragments of pods and the like will pass therethrough. As the beans and fragments pass through the shaker 38 the larger portions of the pods, stems, and the like will be blown off by the blast from the blower 50 and as the beans pass through the screen 39 dust and the like will be blown off by the blower also so that after passing through the screen 39 the beans will be screened and free from foreign matter. After the beans have passed through the shaker and screen they will fall upon the inclined bottom 46 of the pocket 44 and will pass through the opening 47. By placing the sack or other suitable receptacle beneath the opening 47 the beans may be caught and packaged by an operator standing upon the platform 14.

From the foregoing description and a study of the drawings it will be apparent that I have thus provided a comparatively simple and inexpensive device by means of which soya or other beans may be picked, threshed, and deposited within sacks in a very efficient manner and with the minimum amount of labor.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. In a bean harvester comprising a body adapted for propulsion along a field in straddling relation to a row of bean plants, beating mechanism for knocking the beans and pods from the vines comprising a driven shaft journaled transversely through said body, a pair of oppositely extending beater arms carried by said shaft, a gear secured upon said shaft, a longitudinal shaft journaled within said body, a gear on said last named shaft meshing with said first named gear, and oppositely extending beater arms carried by said second named shaft, said first named beater arms rotating in a vertical plane longitudinally of the bean rows and said second named beater arms rotating in a vertical plane transversely of the bean rows, and said pairs of beater arms being timed for non-interference.

2. In a bean harvester comprising a body adapted for propulsion along a field in straddling relation to a row of bean plants, means for knocking off the beans and pods from the vines comprising a transverse driven shaft journaled within the body, oppositely extending beater arms carried by said shaft and each arm being forked, a longitudinal shaft, beater arms carried by said longitudinal shaft and timed for non-interference with said first named beater arms, said pairs of beater arms rotating longitudinally and transversely of the plant row respectively, and interengaging drive members on said first and second named drive shafts whereby to effect simultaneous rotation thereof.

In testimony whereof I affix my signature.

HERMAN H. SWINDELL.